(12) United States Patent
Ito (10) Patent No.: US 10,647,830 B2
(45) Date of Patent: May 12, 2020

(54) THERMALLY CONDUCTIVE SILICONE COMPOSITION AND CURED PRODUCT THEREOF

(71) Applicant: SHIN-ETSU CHEMICAL CO., LTD., Tokyo (JP)

(72) Inventor: Takanori Ito, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 12 days.

(21) Appl. No.: 16/303,056

(22) PCT Filed: Apr. 26, 2017

(86) PCT No.: PCT/JP2017/016458
§ 371 (c)(1),
(2) Date: Nov. 19, 2018

(87) PCT Pub. No.: WO2017/203924
PCT Pub. Date: Nov. 30, 2017

(65) Prior Publication Data
US 2019/0292349 A1 Sep. 26, 2019

(30) Foreign Application Priority Data
May 24, 2016 (JP) .................... 2016-103216

(51) Int. Cl.
*C08K 3/22* (2006.01)
*C08K 3/28* (2006.01)
*C08L 83/14* (2006.01)
*C08L 83/06* (2006.01)
*C09K 5/10* (2006.01)
*C08G 77/00* (2006.01)

(52) U.S. Cl.
CPC ............ *C08K 3/28* (2013.01); *C08K 3/22* (2013.01); *C08L 83/06* (2013.01); *C08L 83/14* (2013.01); *C09K 5/10* (2013.01); *C08G 77/70* (2013.01); *C08K 2003/2227* (2013.01); *C08K 2003/282* (2013.01); *C08K 2201/001* (2013.01); *C08K 2201/005* (2013.01); *C08L 2201/08* (2013.01); *C08L 2205/025* (2013.01)

(58) Field of Classification Search
CPC ....... C08K 2/3337; C08K 2/282; C08L 83/04; C08L 83/06
USPC ........................................................ 524/430
See application file for complete search history.

(56) References Cited

U.S. PATENT DOCUMENTS

| 5,011,870 A | 4/1991 | Peterson |
| 5,344,635 A | 9/1994 | Bujard et al. |
| 6,114,429 A * | 9/2000 | Yamada ............ C08L 83/04 252/512 |
| 2011/0188213 A1* | 8/2011 | Domae ............ C08L 83/04 361/748 |
| 2012/0286220 A1* | 11/2012 | Takasu ............ C08L 83/04 252/582 |
| 2014/0091266 A1* | 4/2014 | Takasu ............ C08L 83/04 252/582 |
| 2015/0122422 A1 | 5/2015 | Hayasaka et al. |
| 2017/0081578 A1 | 3/2017 | Kato et al. |

FOREIGN PATENT DOCUMENTS

| JP | 3-14873 A | 1/1991 |
| JP | 3-295863 A | 12/1991 |
| JP | 6-24715 A | 2/1994 |
| JP | 6-164174 A | 6/1994 |
| JP | 6-209057 A | 7/1994 |
| JP | 11-49958 A | 2/1999 |
| JP | 2004-91743 A | 3/2004 |
| JP | 2005-54099 A | 3/2005 |
| JP | 2005-228955 A | 8/2005 |
| JP | 4357064 B2 | 11/2009 |
| JP | 2009-286855 A | 12/2009 |
| JP | 2010-242022 A | 10/2010 |
| JP | 2012-201106 A | 10/2012 |
| JP | WO 2015/155948 A1 | 10/2015 |

OTHER PUBLICATIONS

International Search Report issued in PCT/JP2017/016458 (PCT/ISA/210), dated Jun. 13, 2017.
Written Opinion of the International Searching Authority issued in PCT/JP2017/016458 (PCT/ISA/237), dated Jun. 13, 2017.
Japanese Office Action for Japanese Application No. 2016-103216, dated Jul. 2, 2019.
Extended European Search Report dated Dec. 17, 2019, in European Patent Application No. 17802522.7.

* cited by examiner

*Primary Examiner* — Margaret G Moore
(74) *Attorney, Agent, or Firm* — Birch, Stewart, Kolasch & Birch, LLP (57) ABSTRACT

A thermally conductive silicone composition having an organopolysiloxane as a base polymer and containing a thermally conductive filler, wherein the thermally conductive silicone composition that includes aluminum nitride having an average particle size of 10-100 μm and crushed alumina having an average particle size of 0.1-5 μm as a thermally conductive filler, contains 15-55 mass % of crushed alumina in the total amount of aluminum nitride and crushed alumina, and contains a total of 60-95 mass % of aluminum nitride and crushed alumina in the thermally conductive silicone composition has excellent moldability, high thermal conductivity and low thermal resistance, can give a cured product also having excellent water resistance, and has good adhesiveness during mounting when used as a heat-dissipating member.

9 Claims, 2 Drawing Sheets

AL-47-1

THERMALLY CONDUCTIVE SILICONE COMPOSITION AND CURED PRODUCT THEREOF

TECHNICAL FIELD

The present invention relates generally to a thermally conductive material which can be placed at a thermal interface between a heat-generating electronic component and a heat-dissipating member, such as a heat sink or a circuit board, for the purpose of cooling the electronic component by heat conduction. The invention relates more particularly to a thermally conductive silicone composition which is set, for example, between a heat-generating component and a heat-dissipating component within an electronic device and used for dissipating heat, and to cured products of the composition.

BACKGROUND ART

Given current trends toward higher functionality, higher speeds, smaller sizes and greater integration, the LSI chips such as CPUs, driver ICs and memories that are used in electronic equipment such as personal computers and cell phones themselves generate large amounts of heat. The rise in chip temperature due to such heat causes chip malfunctions and failure. To address this, numerous heat-dissipating methods for suppressing a rise in chip temperature during operation, and heat-dissipating members for use in such methods, have been described.

Recently, in electronic equipment and the like, heat sinks that employ a metal plate having a high thermal conductivity, such as one made of aluminum or copper, are being used to hold down the rise in chip temperature during operation. Such a heat sink carries away heat generated by the chips and discharges the heat from a surface by way of the temperature difference with outside air.

To efficiently carry away heat generated by the chips in an electronic device, it is necessary to place the heat sink in close contact with the chips. Because of height differences among the chips and the existence of tolerances due to assembly work, a sheet having flexibility or a grease is placed between the chips and the heat sink, and heat conduction from the chips to the heat sink is achieved through this sheet or grease.

With grease-type heat-dissipating materials, a low thermal resistance is achieved by rendering the material into a thin film, but control is difficult. In the application step, there are cases where screen printing or dispensing from a syringe is carried out manually and other cases where application is carried out automatically using a dispenser. However, because such application takes a lot of time and handling is not easy, it is sometimes rate-limiting for the product assembly operation.

Thermally conductive sheets formed of a thermally conductive silicone rubber or the like have an excellent handleability compared with greases, and are used in various fields.

In particular, thermally conductive sheets of low hardness have the following advantages: owing to their shape flexibility, they are capable of faithfully following uneven shapes among devices such as CPUs; they do not prevent the miniaturization of portable equipment such as notebook-type personal computers; and they make efficient heat dissipation possible.

Given the trend in recent years toward increased heat output by heat-generating devices as the level of device integration rises, there exists a desire for heat-dissipating sheets that have a low stress and a high thermally conductivity. Generally, to increase the thermal conductivity of the sheet, it is necessary to load the silicone resin with a large amount of thermally conductive filler, but doing so has the undesirable effects of lowering the compressibility and reliability. To address this, examples have been reported in which, for dielectric applications, a filler having a high thermal conductivity, such as boron nitride or aluminum nitride, is used in order to achieve a higher thermal conductivity at lower loadings. However, depending on the boron nitride, the particles may be flake-like in shape. Therefore, when added to a silicone resin, the particles are incorporated in a reclining state, making it difficult to successfully achieve high thermal conductivity in the a-axis direction. Special treatment that causes the boron nitride particles to be incorporated in a standing state is thus necessary.

A variety of heat-dissipating materials in which aluminum nitride has been selected for use as a highly heat-conductive filler have been reported (Patent Document 1: JP-A H03-14873; Patent Document 2: JP-A H03-295863; Patent Document 3: JP-A H06-164174; Patent Document 4: JP-A H11-49958).

However, aluminum nitride is known to generate aluminum hydroxide and ammonia gas via a hydrolysis reaction with moisture. Because aluminum hydroxide has a much lower thermal conductivity than aluminum nitride powder and the ammonia gas remains behind in the heat-dissipating member as gas bubbles, these cause a decline in the heat-dissipating properties of the heat-dissipating member.

Methods have been proposed that use large-size aluminum nitride having an average particle size of about 100 μm and a high resistance to hydrolysis. However, particularly at reduced device thicknesses, surface irregularities arise on account of the coarse particles, which is a problem in that adherence during packaging decreases and the thermal resistance grows larger.

Hence, from the standpoint of adherence to the substrate, a method that resolves the problem by using a ground-up material having an average particle size of 50 μm or less (Patent Document 5: JP-A H6-209057) and a method which uses in combination a ground-up material having an average particle size of not more than 30 to 50 μm obtained from sintered compacts of aluminum nitride and unsintered aluminum nitride having an average particle size of 0.1 to 5 μm (Patent Document 6: JP-A H6-24715) have been disclosed. However, fully enhancing the thermal conductivity has been difficult on account of, in the former, the small particle size, and in the latter, the high content of fine powder.

Also, Patent Document 7 (JP No. 4357064) discloses a heat-dissipating member that has excellent thermal conductivity and resistance to hydrolysis by optimizing the particle size makeup of the aluminum nitride. This is characterized in that the thermal conductivity and adherence are both increased by concomitantly using aluminum nitride having an average particle size of 1 to 3 μm. However, with aluminum nitride having an average particle size of 1 to 3 μm, there is a concern that the material will end up having a higher viscosity and a lower moldability. Moreover, selecting aluminum nitride as the fine powder leads to higher costs.

Patent Document 8 (JP-A 2004-91743 discloses a thermally conductive grease which, by including spherical alumina having an average particle size of 0.2 to 1.0 μm and aluminum nitride having an average particle size of 1 to 3 μm and a maximum particle size of 2 to 10 μm, suppresses an increase in viscosity, enabling a thinner film to be obtained. However, a drawback is that, because the particle size of the aluminum nitride is small, achieving a higher thermal conductivity is difficult.

In silicone-based heat-dissipating members that use aluminum nitride, the challenge is to provide heat-dissipating members having a high thermal conductivity and excellent water resistance. By including large-particle-size aluminum nitride, the water resistance and thermal conductivity improve, but surface irregularities readily arise and the thermal resistance increases. Although one conceivable approach is to increase adherence by including a fine powder such as aluminum nitride, an increased amount of fine powder is an obstacle to achieving a higher thermal conductivity. A formulation which suppresses a decline in the thermal conductivity and can increase adherence is thus required. In the interest of cutting costs, there is also a need to use a less expensive fine powder.

PRIOR ART DOCUMENTS

Patent Documents

Patent Document 1: JP-A H03-14873
Patent Document 2: JP-A H03-295863
Patent Document 3: JP-A H06-164174
Patent Document 4: JP-A H11-49958
Patent Document 5: JP-A H06-209057
Patent Document 6: JP-A H06-24715
Patent Document 7: JP No. 4357064
Patent Document 8: JP-A 2004-91743

SUMMARY OF INVENTION

Technical Problem

It is therefore an object of this invention to provide thermally conductive silicone compositions that can be used as heat-dissipating members which have excellent thermal conductivity and water resistance, and moreover also have good adherence during packaging. Another object of the invention is to provide cured products of such compositions.

Solution to Problem

The inventor, having conducted extensive investigations aimed at achieving the above object, has discovered as a result that, in a thermally conductive silicone composition having an organopolysiloxane as the base polymer and containing a thermally conductive filler, by using as the thermally conductive filler a specific amount of aluminum nitride having an average particle size of 10 to 100 μm and crushed alumina having an average particle size of 0.1 to 5 μm in a specific compounding ratio therebetween, a thermally conductive silicone composition of excellent water resistance and thermal conductivity and also having good adherence during packaging can be provided at a reduced cost.

Accordingly, the invention provides the following highly thermally conductive silicone composition and cured product thereof.

[1]
A thermally conductive silicone composition comprising an organopolysiloxane as a base polymer and a thermally conductive filler, wherein the thermally conductive filler includes aluminum nitride having an average particle size of 10 to 100 μm and crushed alumina having an average particle size of 0.1 to 5 μm, the crushed alumina accounting for 15 to 55 wt % of the collective amount of aluminum nitride and crushed alumina, and the aluminum nitride and crushed alumina collectively accounting for 60 to 95 wt % of the thermally conductive silicone composition.

[2]
The thermally conductive silicone composition [1] above, comprising:
(A-1) 100 parts by weight of an organopolysiloxane containing at least two silicon-bonded alkenyl groups on the molecule and having a kinematic viscosity at 25° C. of from 10 to 100,000 mm²/s;
(B) from 1,000 to 4,000 parts by weight of, as the thermally conductive filler, aluminum nitride having an average particle size of 10 to 100 μm and crushed alumina having an average particle size of 0.1 to 5 μm;
(C-1) an organohydrogenpolysiloxane having at least two hydrogen atoms directly bonded to silicon atoms, in an amount such that the number of moles of hydrogen atoms directly bonded to silicon atoms is from 0.1 to 8 moles per mole of alkenyl groups from component (A-1); and
(D) from 0.1 to 2,000 ppm of a platinum family metal-based curing catalyst, expressed as the weight of the platinum family metallic element with respect to component (A-1), wherein the crushed alumina in component (B) is included in a proportion of at least 15 wt % and not more than 55 wt % of the total weight of component (B).

[3]
The thermally conductive silicone composition of [1] above, comprising:
(A-2) 100 parts by weight of an organopolysiloxane of general formula (1) below

[Chem. 1]

(1)

(wherein the R¹ groups are mutually like or unlike unsubstituted, halogen-substituted or cyano-substituted alkyl groups of 1 to 5 carbon atoms or aryl groups of 6 to 8 carbon atoms; and the subscript "a" is a number that sets the kinematic viscosity at 25° C. of the organopolysiloxane of formula (1) to the below-indicated value) which is capped at both ends with hydroxyl groups and has a kinematic viscosity at 25° C. of from 10 to 100,000 mm²/s;
(B) from 1,000 to 4,000 parts by weight of, as the thermally conductive filler, aluminum nitride having an average particle size of 10 to 100 μm and crushed alumina having an average particle size of 0.1 to 5 μm;
(C-2) from 1 to 40 parts by weight of one or more selected from the group consisting of silane compounds of general formula (2) below (wherein R² is an unsubstituted, halogen-substituted or cyano-substituted alkyl group of 1 to 3 carbon atoms, vinyl group or phenyl group; X is a hydrolyzable group; and the subscript b is 0 or 1), (partial) hydrolyzates thereof and (partial) hydrolytic condensates thereof; and
(F) from 0.01 to 20 parts by weight of a curing catalyst for a condensation reaction selected from the group consisting of alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, lower fatty acid salts of alkali metals, dialkylhydroxylamines and guanidyl group-containing silanes and siloxanes, wherein the crushed alumina in component (B) is included in a proportion of at least 15 wt % and not more than 55 wt % of the total weight of component (B).

[4]

The thermally conductive silicone composition of [1] above, comprising:

(A-3) 100 parts by weight of an organopolysiloxane containing at least two silicon-bonded alkenyl groups on the molecule and having a kinematic viscosity at 25° C. of from 10 to 100,000 mm$^2$/s;

(B) from 1,000 to 4,000 parts by weight of, as the thermally conductive filler, aluminum nitride having an average particle size of 10 to 100 μm and crushed alumina having an average particle size of 0.1 to 5 μm; and (G) from 0.01 to 10 parts by weight of an organic peroxide, wherein the crushed alumina in component (B) is included in a proportion of at least 15 wt % and not more than 55 wt % of the total weight of component (B).

[5]

The thermally conductive silicone composition of any of [1] to [4] above, wherein the aluminum nitride in the thermally conductive filler is crushed and/or spherical.

[6]

The thermally conductive silicone composition of [5] above, wherein crushed aluminum nitride having an average particle size of 10 to 100 μm in the thermally conductive filler is included in a proportion of at least 10 wt % and not more than 50 wt % of the total weight of the thermally conductive filler.

[7]

The thermally conductive silicone composition of any of [2] to [6] above which further comprises, as component (H), from 10 to 200 parts by weight per 100 parts by weight of component (A-1), (A-2) or (A-3) of at least one selected from the group consisting of:

(H-1) alkoxysilane compounds of general formula (3) below (wherein R$^3$ is independently an alkyl group of 6 to 15 carbon atoms, R$^4$ is independently a substituted or unsubstituted monovalent hydrocarbon group of 1 to 8 carbon atoms, R$^5$ is independently an alkyl group of 1 to 6 carbon atoms, the subscript c is an integer from 1 to 3, the subscript d is 0, 1 or 2, and the sum c+d is an integer from 1 to 3); and (H-2) dimethylpolysiloxanes of general formula (4) below

[Chem. 2]

(wherein R$^6$ is independently an alkyl group of 1 to 6 carbon atoms, and the subscript e is an integer from 5 to 100) which are capped at one end of the molecular chain with a trialkoxysilyl group.

[8]

The thermally conductive silicone composition of any of [2] to [7] above which further comprises:

(I) from 1 to 40 parts by weight, per 100 parts by weight of component (A-1), (A-2) or (A-3), of an organopolysiloxane of general formula (5) below (wherein R$^7$ is independently a monovalent hydrocarbon group of 1 to 8 carbon atoms without aliphatic unsaturated bonds, and the subscript f is an integer from 5 to 2,000) having a kinematic viscosity at 25° C. of from 10 to 100,000 mm$^2$/s.

[9]

A cured product of the thermally conductive silicone composition of any of [1] to [8] above, which cured product has a thermal conductivity of at least 5 W/mK.

Advantageous Effects of Invention

The thermally conductive silicone composition of the invention, by using spherical and/or crushed aluminum nitride having an average particle size of 10 to 100 μm and crushed alumina having an average particle size of 0.1 to 5 μm in a suitable compounding ratio, has an excellent moldability and can provide cured products which are endowed with a high thermal conductivity and a low thermal resistance, and moreover have an excellent water resistance.

BRIEF DESCRIPTION OF DIAGRAMS

DESCRIPTION OF EMBODIMENTS

Figure 1:
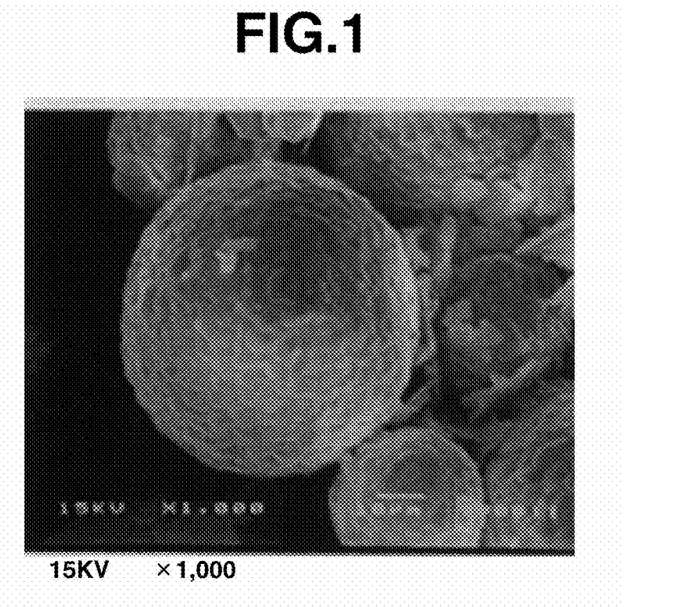
FIG. 1 is a scanning electron microscopic (SEM) image of a spherical aluminum nitride (FAN-f-80, from Furukawa Denshi Co., Ltd.; 80 μm) used in the Examples.
Figure 2:
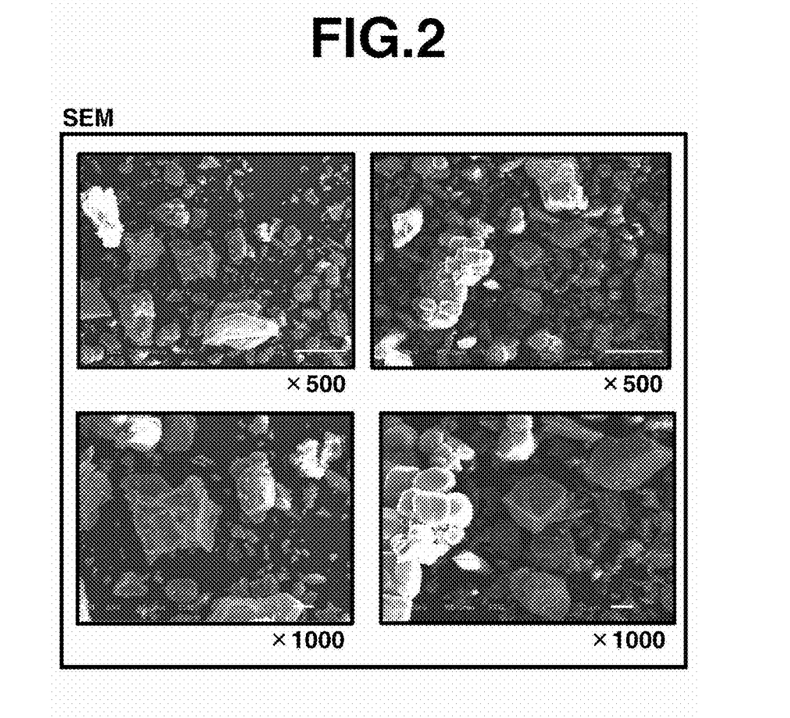
FIG. 2 is a SEM image of a crushed aluminum nitride (TFG-N40P, from Toyo Aluminum KK; 40 μm) used in the Examples.
Figure 3:
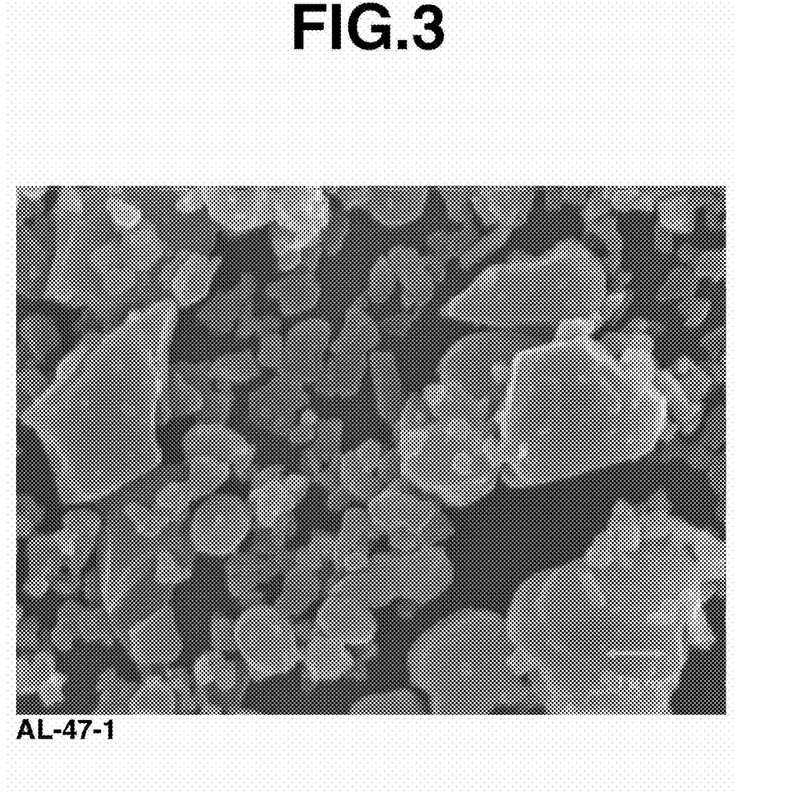
FIG. 3 is a SEM image of a crushed alumina (AL-47-1, from Showa Denko KK; 1 μm) used in the Examples.

The invention is described in detail below.

The thermally conductive silicone composition of the invention is characterized by, in a thermally conductive silicone composition that has an organopolysiloxane as the base polymer and includes a thermally conductive filler, including as the thermally conductive filler both aluminum nitride having an average particle size of 10 to 100 μm and crushed alumina having an average particle size of 0.1 to 5 μm, the crushed alumina accounting for 15 to 55 wt % of the collective amount of aluminum nitride and crushed alumina, and the aluminum nitride and crushed alumina collectively accounting for 60 to 95 wt % of the thermally conductive silicone composition.

[Thermally Conductive Filler]

Aluminum nitride and alumina are selected for use as the thermally conductive filler, which specifically includes crushed aluminum having an average particle size of 0.1 to 5 μm and aluminum nitride having an average particle size of 10 to 100 μm. The crushed alumina accounts for at least 15 wt % and not more than 55 wt % of all the thermally conductive filler.

The crushed alumina has an average particle size of from 0.1 to 5 μm, preferably from 0.5 to 5 μm, and more preferably from 1 to 3 μm. At an average particle size of less than 0.1 μm, the greatest density to which the crushed alumina can be loaded in the composition decreases, the viscosity rises and molding becomes difficult. When crushed alumina having an average particle size greater than 5 μm is used, the surface of the cured product becomes uneven, as a result of which adherence worsens and thermal resistance rises. The use of crushed aluminum nitride having an average particle size of 0.1 to 5 μm poses problems in that the viscosity of the composition tends to rise more than in cases where crushed alumina of the same particle size is used, in addition to which the cost increases.

The aluminum nitride used may be crushed and/or spherical aluminum nitride. The average particle size of the aluminum nitride is from 10 to 100 μm, preferably from 15 to 90 μm, and more preferably from 30 to 80 μm. At an average particle size of less than 10 μm, the thermal conductivity decreases; at an average particle size in excess of 100 μm, abrasion of the kneading equipment occurs.

Here, "average particle size" refers to, when the volume distribution of the powder is measured with a MICROTRACK particle size analyzer (laser diffraction scattering method), the diameter at which, on dividing the distribution into two about this average particle size as the boundary, the coarse side and the fine side are equal. The average particle size mentioned in the text below is everywhere defined in this way.

In this invention, the crushed alumina accounts for a proportion of the overall thermally conductive filler that is at least 15 wt % and not more than 55 wt %, and preferably at least 25 wt % and not more than 45 wt %. When the proportion of crushed aluminum exceeds 55 wt %, the thermal conductivity of the resulting cured product greatly decreases. On the other hand, when the proportion is less than 15 wt %, the reliability under highly accelerated stress test (HAST, an unsaturated pressure cooker test) conditions decreases. For example, when a molded product is aged at 85° C. and 85% RH, curing of the molding proceeds to a marked degree, resulting in a major rise in the thermal resistance of the molding.

In this invention, as mentioned above, crushed aluminum nitride can be used as the aluminum nitride component. When doing so, crushed aluminum nitride having an average particle size of 10 to 100 μm is included in a proportion of preferably at least 10 wt % and not more than 50 wt %, and more preferably at least 20 wt % and not more than 40 wt %, based on the overall weight of the thermally conductive filler. Crushed aluminum nitride, because it has a structure with an aspect ratio, when suitably incorporated, is thought to effectively form within the resin a heat conduction path in the thickness direction. When the proportion of crushed aluminum nitride is less than 10 wt %, a decrease in the thermal conductivity of the composition may occur. On the other hand, when the proportion is more than 50 wt %, there is a chance that the viscosity of the silicone composition will increase, lowering the moldability.

The amount of thermally conductive filler (the combined amount of aluminum nitride and crushed alumina) included is from 60 to 95 wt %, preferably from 65 to 95 wt %, and more preferably from 70 to 95 wt %, of the thermally conductive silicone composition. When the amount of thermally conductive filler included is too low, the thermal conductivity of the composition decreases; when it is too high, the viscosity of the composition rises, making molding difficult.

[Organopolysiloxane as Base Polymer]

The organopolysiloxane used as the base polymer in this invention has a kinematic viscosity at 25° C. of preferably from 10 to 100,000 mm$^2$/s, and more preferably from 500 to 50,000 mm$^2$/s. When this kinematic viscosity is too low, the shelf stability of the resulting composition may worsen; when it is too high, the extensibility of the resulting composition may worsen. In this invention, the kinematic viscosity can be measured with an Ostwald viscometer (the same applies below).

The type of organopolysiloxane used as this base polymer is not particularly limited. In general, one in which the backbone portion is substantially made up of repeating diorganosiloxane units is common. This is because, although a portion of the molecular structure may include branched structures or may be cyclic, in terms of the mechanical strength and other physical properties of the cured product, a linear diorganopolysiloxane is preferred. The ends of the organopolysiloxane may be capped with triorganosilyl groups or diorganohydroxysilyl groups.

The organic groups bonded to silicon atoms on the organopolysiloxane are exemplified by substituted or unsubstituted monovalent hydrocarbon groups which may have an intervening oxygen atom. Specific examples include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; alkenyl groups such as vinyl, allyl, propenyl, isopropenyl, butenyl, hexenyl and cyclohexenyl groups; aryl groups such as phenyl, tolyl, xylyl, naphthyl and biphenylyl groups; aralkyl groups such as benzyl, phenylethyl, phenylpropyl and methylbenzyl groups; any of these groups in which some or all hydrogen atoms bonded to carbon atoms are substituted with halogen atoms such as fluorine, chlorine or bromine, cyano groups or the like, specific examples of which include chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups; and alkoxy groups such as methoxy, ethoxy and propoxy groups. Typical examples are those having from 1 to 10 carbon atoms, especially ones having from 1 to 6 carbon atoms, with the following being preferred: substituted or unsubstituted alkyl groups of 1 to 3 carbon atoms, such as methyl, ethyl, propyl, chloromethyl, bromoethyl, 3,3,3-trifluoropropyl and cyanoethyl groups; lower alkenyl groups such as vinyl and allyl groups; and substituted or unsubstituted phenyl groups such as phenyl, chlorophenyl and fluorophenyl groups. The organic groups bonded to silicon atoms need not necessarily all be the same.

This organopolysiloxane may be of one type used alone, or two or more types having different kinematic viscosities may be used in combination.

As noted above, the type of organopolysiloxane used as the base polymer in the present invention is not particularly limited. The curable thermally conductive silicone composition itself is exemplified by the three forms shown below. The composition may be one which uses any of the subsequently described components (A-1) to (A-3) as the organopolysiloxane (A) serving as the base polymer and which includes the above-described thermally conductive filler (B).

[1] Addition-curable thermally conductive silicone compositions

[2] Condensation-curable thermally conductive silicone compositions

[3] Organic peroxide-curable thermally conductive silicone compositions

The respective compositions are described in detail below.

[1] Addition-Curable Thermally Conductive Silicone Compositions

In cases where the composition is an addition-curable thermally conductive silicone composition that cures by way of a hydrosilylation reaction, it is desirable to use component (A-1) shown below as the organopolysiloxane (A) serving as the base polymer, to add the above-described thermally conductive filler (B), and moreover to include the ingredients shown below:

(A-1) an organopolysiloxane having at least two silicon-bonded alkenyl groups on the molecule and having a kinematic viscosity at 25° C. of from 10 to 100,000 mm²/s, (B) the above-described thermally conductive filler, (C-1) as a crosslinking agent, an organohydrogenpolysiloxane having at least two hydrogen atoms directly bonded to silicon atoms, (D) a platinum family metal-based curing catalyst, and preferably also (E) an addition reactor regulator.

[(A-1) Alkenyl Group-Containing Organopolysiloxane]

The alkenyl group-containing organopolysiloxane used as component (A-1) is an organopolysiloxane having 2 or more, preferably from 2 to 20, and more preferably from 2 to 10, silicon-bonded alkenyl groups per molecule and having a kinematic viscosity at 25° C. of from 10 to 100,000 mm²/s. The organopolysiloxane is typically one in which the backbone portion is basically composed of repeating diorganosiloxane units, although it may include branched structures in a portion of the molecular structure or may be a cyclic body. From the standpoint of physical properties such as the mechanical strength of the cured product, a linear diorganopolysiloxane is preferred.

The silicon-bonded alkenyl groups are exemplified by ones typically having about 2 to about 8 carbon atoms, such as vinyl, allyl, propenyl, isopropenyl, butenyl, hexenyl and cyclohexenyl groups. Of these, lower alkenyl groups such as vinyl and allyl groups are preferred. Vinyl groups are especially preferred.

These silicon-bonded alkenyl groups may be present, within a molecule of the organopolysiloxane serving as component (A-1), either at the ends of the molecular chain or at non-terminal portions of the molecule (i.e., side chains on the molecular chain), or may be present at both. Preferably, the silicone-bonded alkenyl groups are present at least at both ends of the molecular chain.

Silicon-bonded organic groups other than alkenyl groups include substituted or unsubstituted monovalent hydrocarbon groups that may have an intervening oxygen atom, examples of which include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; any of these groups in which some or all hydrogen atoms bonded to carbon atoms are substituted with halogen atoms such as fluorine, chlorine or bromine, cyano groups or the like, specific examples of which include chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups; and alkoxy groups such as methoxy, ethoxy and propoxy groups. Typical examples are those having from 1 to 10 carbon atoms, and especially ones having from 1 to 6 carbon atoms, with the following being preferred: substituted or unsubstituted alkyl groups of 1 to 3 carbon atoms, such as methyl, ethyl, propyl, chloromethyl, bromoethyl, 3,3,3-trifluoropropyl and cyanoethyl groups; substituted or unsubstituted phenyl groups such as phenyl, chlorophenyl and fluorophenyl groups; and alkoxy groups such as a methoxy group. The silicon-bonded functional groups other than alkenyl groups need not necessarily all be the same.

This organopolysiloxane has a kinematic viscosity at 25° C. of from 10 to 100,000 mm²/s, preferably from 50 to 50,000 mm²/s, and more preferably from 100 to 20,000 mm²/s. When the kinematic viscosity is too low, loading of the thermally conductive filler is difficult; when it is too high, the viscosity of the composition rises, making molding difficult.

[(B) Thermally Conductive Filler]

Component (B) used in the addition-curable thermally conductive silicone composition is the above-described thermally conductive filler (B). The amount of component (B) included per 100 parts by weight of component (A-1) is from 1,000 to 4,000 parts by weight, preferably from 1,500 to 3,500 parts by weight, and more preferably from 2,000 to 3,000 parts by weight. When the amount of component (B) included is too small, the thermal conductivity of the composition decreases; when the amount is too large, the moldability of the composition markedly declines.

[(C-1) Organohydrogenpolysiloxane]

The organohydrogenpolysiloxane used as component (C-1) in the addition-curable thermally conductive silicone composition is an organohydrogenpolysiloxane having an average of at least 2, and preferably from 2 to 100, hydrogen atoms directly bonded to silicon atoms (Si—H groups) on the molecule, and is an ingredient that acts as a crosslinking agent for component (A-1). That is, addition takes place by way of hydrosilylation reactions between Si—H groups in component (C-1) and alkenyl groups in component (A-1) that are accelerated by subsequently described component (D), a platinum family metal-based curing catalyst, thereby giving a three-dimensional network structure having a crosslinked structure. When the number of Si—H groups is less than two, curing may not occur.

The organohydrogenpolysiloxane serving as component (C-1) is preferably one having general formula (6) below.

[Chem. 3]

In this formula, each $R^8$ is independently a substituted or unsubstituted monovalent hydrocarbon group without an aliphatic unsaturated bond or is a hydrogen atom, with the proviso that at least two $R^8$ groups are hydrogen atoms. Also, the subscript g is an integer of 1 or more, preferably an integer from 1 to 100, and more preferably an integer from 2 to 50.

Examples of substituted or unsubstituted monovalent hydrocarbon groups without an aliphatic unsaturated bond, other than hydrogen atoms, represented by $R^8$ in above formula (6) include alkyl groups such as methyl, ethyl, propyl, isopropyl, butyl, isobutyl, tert-butyl, pentyl, neopentyl, hexyl, heptyl, octyl, nonyl, decyl and dodecyl groups; cycloalkyl groups such as cyclopentyl, cyclohexyl and cycloheptyl groups; aryl groups such as phenyl, tolyl, xylyl, naphthyl and biphenylyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine, cyano groups or the like, specific examples of which include chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups. Typical examples are those having from 1 to 10 carbon atoms, and especially ones having from 1 to 6 carbon atoms, with the following being preferred: substituted or unsubstituted alkyl groups of 1 to 3 carbon atoms, such as methyl, ethyl, propyl, chloromethyl, bromoethyl, 3,3,3-trifluoropropyl and cyanoethyl groups; and substituted or unsubstituted phenyl groups such as phenyl, chlorophenyl and fluorophenyl groups. The $R^8$ groups other than hydrogen atoms need not necessarily all be the same.

Of the $R^8$ groups, at least 2, preferably from 2 to 100, and more preferably from 2 to 50, are hydrogen atoms. These hydrogen atoms may be present either at the ends of the molecular chain or at non-terminal positions on the molecular chain (i.e., side chains of the molecular chain), or may be present at both.

These component (C-1) organohydrogenpolysiloxanes are added in an amount such that the amount of Si—H groups from component (C-1) per mole of alkenyl groups from component (A-1) becomes from 0.1 to 8 moles, preferably from 0.5 to 5 moles, and more preferably from 1 to 4 moles. When the amount of Si—H groups from component (C-1) is less than 0.1 mole per mole of alkenyl groups from component (A-1), curing does not occur or the strength of the cured product is inadequate, so that it is unable to keep its shape as a molded product and is difficult to handle. On the other hand, when this amount exceeds 8 moles, the cured product lacks flexibility and the thermal resistance markedly rises.

[(D) Platinum Family Metal-Based Curing Catalyst]

The platinum family metal-based curing catalyst used as component (D) is an addition reaction catalyst for accelerating addition reactions between alkenyl groups from component (A-1) and Si—H groups from component (C-1), and is exemplified by catalysts that are well known as catalysts used in hydrosilylation reactions. Specific examples include platinum family metals alone, such as platinum (including platinum black), rhodium and palladium; platinum chloride, chloroplatinic acid and chloroplatinates such as $H_2PtCl_4.nH_2O$, $H_2PtCl_6.nH_2O$, $NaliPtCl_6.nH_2O$, $KHPtCl_6.nH_2O$, $Na_2PtCl_6.nH_2O$, $K_2PtCl_4.nH_2O$, $PtCl_4.nH_2O$, $PtCl_2$ and $Na_2HPtCl_4.nH_2O$ (wherein n is an integer from 0 to 6, and is preferably 0 or 6); alcohol-modified chloroplatinic acid (see U.S. Pat. No. 3,220,972); complexes of chloroplatinic acid and olefins (see U.S. Pat. Nos. 3,159,601, 3,159,662 and 3,775,452); systems obtained by supporting a platinum family metal such as platinum black or palladium on a support such as alumina, silica or carbon; rhodium-olefin complexes; chlorotris(triphenylphosphine)rhodium (Wilkinson catalyst); and complexes of platinum chloride, chloroplatinic acid or chloroplatinate with a vinyl group-containing siloxane, especially a vinyl group-containing organocyclic siloxane.

The amount of component (D) used may be the so-called catalytic amount. Generally, an amount, expressed as the platinum family metallic element weight with respect to component (A-1), of from about 0.1 ppm to about 2,000 ppm is acceptable.

[(E) Addition Reaction Regulator]

An addition reaction regulator (E) may be optionally used in the addition-curable thermally conductive silicone composition. Any known addition reaction regulator capable of being used in ordinary addition-curable silicone compositions may be used as the addition reaction regulator. Examples include acetylene compounds such as 1-ethynyl-1-hexanol and 3-butyn-1-ol, and various nitrogen compounds, organophosphorus compounds, oxime compounds and organochloro compounds. The amount of addition reaction regulator used is preferably from about 0.01 to about 1 part by weight per 100 parts by weight of component (A-1).

[2] Condensation-Curable Thermally Conductive Silicone Composition

In cases where the inventive composition is a condensation-curable thermally conductive silicone composition that cures by way of a condensation reaction, it is preferable to use component (A-2) shown below as the organopolysiloxane (A) serving as the base polymer, to add the above-described thermally conductive filler (B), and to include also the following ingredients:

(A-2) an organopolysiloxane of general formula (1) below

[Chem. 4]

(wherein the $R^1$ groups are mutually like or unlike unsubstituted, halogen-substituted or cyano-substituted alkyl groups of 1 to 5 carbon atoms or aryl groups of 6 to 8 carbon atoms; and the subscript "a" is a number that sets the kinematic viscosity at 25° C. of the organopolysiloxane of formula (1) to the below-indicated value) which is capped at both ends with hydroxyl groups and has a kinematic viscosity at 25° C. of from 10 to 100,000 mm²/s;

(B) the above-described thermally conductive filler;

(C-2) one or more selected from the group consisting of silane compounds of general formula (2) below

(wherein $R^2$ is an unsubstituted, halogen-substituted or cyano-substituted alkyl group of 1 to 3 carbon atoms, vinyl group or phenyl group; X is a hydrolyzable group; and the subscript b is 0 or 1), (partial) hydrolyzates thereof and (partial) hydrolytic condensates thereof; and (F) a curing catalyst for a condensation reaction, which condensation catalyst is selected from the group consisting of alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, lower fatty acid salts of alkali metals, dialkylhydroxylamines and guanidyl group-containing silanes and siloxanes.

[(A-2) Organopolysiloxanes Capped at Both Ends with Hydroxyl Groups]

Component (A-2), which is used as the base polymer when the silicone composition of the invention is to be rendered into condensation cured products, is an organopolysiloxane of general formula (1) below that is capped at both ends with hydroxyl groups and has a kinematic viscosity at 25° C. of 10 to 100,000 mm²/s.

[Chem. 5]

(1)

In this formula, the $R^1$ groups are mutually like or unlike unsubstituted, halogen-substituted or cyano-substituted alkyl groups of 1 to 5 carbon atoms or aryl groups of 6 to 8 carbon atoms; and the subscript "a" is a number that sets the kinematic viscosity at 25° C. of the organopolysiloxane of formula (1) to the above-indicated value.

Specific examples of $R^1$ in formula (1) include alkyl groups of 1 to 5 carbon atoms, such as methyl, ethyl, propyl, butyl, pentyl, hexyl and heptyl groups; aryl groups of 6 to 8 carbon atoms, such as phenyl and tolyl groups; and any of these alkyl groups or aryl groups in which some or all hydrogen atoms are substituted with halogen atoms such as chlorine, fluorine or bromine or with cyano groups, examples of the latter including halogen atom-substituted alkyl groups or aryl groups and cyano-substituted alkyl groups or aryl groups, such as chloromethyl, 3-chloropropyl, trifluoromethyl and cyanoethyl groups. These may be used singly or two or more may be used in suitable combination.

The subscript "a" is a number that sets the kinematic viscosity at 25° C. of the organopolysiloxane of formula (1) to the below-indicated value.

The kinematic viscosity at 25° C. of this organopolysiloxane is from 10 to 100,000 mm²/s, preferably from 50 to 50,000 mm²/s, and more preferably from 100 to 25,000 mm²/s. When the kinematic viscosity is too low, the thermally conductive filler cannot be loaded therein; when it is too high, the viscosity of the composition rises and the moldability ends up decreasing.

[(B) Thermally Conductive Filler]

Component (B) used in the condensation-curable thermally conductive silicone composition is the above-described thermally conductive filler (B). The amount of component (B) included per 100 parts by weight of component (A-2) is from 1,000 to 4,000 parts by weight, preferably from 1,500 to 3,500 parts by weight, and more preferably from 2,000 to 3,000 parts by weight. When the amount of component (B) included is too small, the thermal conductivity of the composition decreases; when the amount is too large, the viscosity of the composition rises, as a result of which molding is difficult.

[(C-2) Organosilicon Compound]

Component (C-2) is one or more selected from the group consisting of silane compounds of general formula (2) below (2)

(wherein $R^2$ is an unsubstituted, halogen-substituted or cyano-substituted alkyl group of 1 to 3 carbon atoms, vinyl group or phenyl group; X is a hydrolyzable group; and the subscript b is 0 or 1), (partial) hydrolyzates thereof, and (partial) hydrolytic condensates thereof. Component (C-2) acts as a crosslinking agent when the composition is cured by way of a condensation reaction.

In formula (2), $R^2$ is an unsubstituted, halogen-substituted or cyano-substituted alkyl group of 1 to 3 carbon atoms (e.g., methyl, ethyl or propyl), vinyl group or phenyl group.

X is a hydrolyzable group, examples of which include alkoxy groups, alkoxyalkoxy groups, alkenyloxy groups, ketoxime groups, acyloxy groups, amino groups, amide groups and aminoxy groups. Examples of alkoxy groups and alkoxyalkoxy groups, which may be halogen-substituted, include methoxy, ethoxy, isopropoxy, butoxy, β-chloroethoxy, 2,2,2-trifluoroethoxy, δ-chlorobutoxy and methoxyethoxy groups. An example of an alkenyloxy group is the isopropenoxy group. Examples of ketoxime groups include dimethyl ketoxime, methyl ethyl ketoxime and diethyl ketoxime groups. Examples of acyloxy groups include acetoxy and propionyloxy groups. Examples of amino groups include dimethylamino, diethylamino, n-butylamino and cyclohexylamino groups. Examples of amide groups include N-methylacetamide, N-ethylacetamide, N-butylacetamide and N-cyclohexylacetamide groups. Examples of aminoxy groups include N,N-dimethylaminoxy and N,N-diethylaminoxy groups. X is most preferably an alkenyloxy group. The subscript b is 0 or 1.

Specific examples of these silane compounds and (partial) hydroxylates and (partial) hydrolytic condensates thereof include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, tetra(β-chloroethoxy)silane, tetra(2,2,2-trifluoroethoxy)silane, propyltris(δ-chlorobutoxy)silane and methyltris(methoxyethoxy)silane; alkoxysiloxanes such as ethyl polysilicate and dimethyltetramethoxydisiloxane; ketoxime silanes such as methyltris(methyl ethyl ketoxime) silane, vinyltris(methyl ethyl ketoxime)silane, phenyltris(methyl ethyl ketoxime)silane, methyltris(diethyl ketoxime) silane and tetra(methyl ethyl ketoxime)silane; aminosilanes such as methyltris(cyclohexylamino)silane and vinyltris(n-butylamino)silane; amidosilanes such as methyltris(N-methylacetamido)silane, methyltris(N-butylacetamido)silane and methyltris(N-cyclohexylacetamido)silane; aminoxysilanes such as methyltris(N,N-diethylaminoxy)silane; alkenyloxysilanes such as methyltri(isopropenoxy)silane, vinyltri(isopropenoxy)silane and phenyltri(isopropenoxy)silane; acyloxysilanes such as methyltriacetoxysilane and vinyltriacetoxysilane; and (partial) hydrolyzates and (partial) hydrolytic condensates of these silanes.

The amount of component (C-2) included per 100 parts by weight of component (A-2) is from 1 to 40 parts by weight, and preferably from 2 to 30 parts by weight. When the amount included is less than 1 part by weight, the composition does not cure; when it is more than 40 parts by weight, curing is difficult.

[(F) Curing Catalyst for Condensation Reaction]

Component (F) is a curing catalyst for condensation reactions that is selected from the group consisting of alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, lower fatty acid salts of alkali metals, dialkylhydroxylamines and guanidyl group-containing silanes and siloxanes. These may be used singly or two or more may be used in suitable combination.

Specific examples include alkyltin ester compounds such as dibutyltin diacetate, dibutyltin dilaurate and dibutyltin dioctoate; titanic acid esters such as tetraisopropoxytitanium, tetra-n-butoxytitanium, tetrakis(2-ethylhexoxy)titanium, dipropoxybis(acetylacetonato)titanium and titanium isopropoxyoctylene glycol; titanium chelate compounds such as titanium diisopropoxybis(ethyl acetoacetate), titanium diisopropoxybis(methyl acetoacetate), titanium diisopropoxybis(acetylacetonate), titanium dibutoxybis(ethyl acetoacetonate) and titanium dimethoxybis(ethyl acetoacetonate); organometallic (zinc, iron, cobalt, manganese, aluminum) compounds such as zinc naphthenate, zinc stearate, zinc 2-ethyloctoate, iron-2-ethylhexoate, cobalt-2-ethylhexoate, manganese 2-ethylhexoate, cobalt naphthenate and alkoxyaluminum compounds; 3-aminopropyltriethoxysilane; hexylamine; dodecylamine phosphate; quaternary ammonium salts such as benzyltriethylammonium acetate; lower fatty acid salts of alkali metals, such as potassium acetate, sodium acetate and lithium oxalate; dialkylhydroxylamines such as dimethylhydroxylamine and diethylhydroxylamine; and guanidyl group-containing silanes and siloxanes, such as tetramethylguanidylpropyltrimethoxysilane, tetramethylguanidylpropylmethyldimethoxysilane and tetramethylguanidylpropyltris(trimethylsiloxy)silane. Of these, the use of guanidyl group-containing silanes and siloxanes, such as tetramethylguanidylpropyltrimethoxysilane, tetramethylguanidylpropylmethyldimethoxysilane and tetramethylguanidylpropyltris(trimethylsiloxy)silane is preferred.

The amount of component (F) included per 100 parts by weight of component (A-2) is from 0.01 to 20 parts by weight, and preferably from 0.1 to 5 parts by weight. When the amount included is less than 0.01 part by weight, curing of the composition is difficult. When more than 20 parts by weight is included, this is uneconomical and lowers the shelf stability of the composition.

[3] Organic Peroxide-Curable Thermally Conductive Silicone Composition

In cases where the inventive composition is an organic peroxide-curable thermally conductive silicone composition that cures by way of an organic peroxide-induced free radical reaction, it is preferable to use component (A-3) shown below as the organopolysiloxane (A) serving as the base polymer, to add the above-described thermally conductive filler (B), and to include also the following ingredients:

(A-3) an organopolysiloxane which has at least two silicon-bonded alkenyl groups on the molecule and has a kinematic viscosity at 25° C. of from 10 to 100,000 mm²/s;

(B) the above-described thermally conductive filler; and (G) an organic peroxide.

[(A-3) Organopolysiloxane]

The organopolysiloxane of component (A-3) is not particularly limited so long as it is an organopolysiloxane having at least two silicon-bonded alkenyl groups per molecule and a kinematic viscosity at 25° C. of from 10 to 100,000 mm²/s, although it is preferable to use one that is similar to the organopolysiloxane having at least two alkenyl groups per molecule of above-described component (A-1).

[(B) Thermally Conductive Filler]

Component (B) used in the organic peroxide-curable thermally conductive silicone composition is the above-described thermally conductive filler (B). The amount of component (B) included per 100 parts by weight of component (A-3) is from 1,000 to 4,000 parts by weight, preferably from 1,500 to 3,500 parts by weight, and more preferably from 2,000 to 3,000 parts by weight. When the amount of component (B) included is too small, the thermal conductivity of the composition decreases; when the amount is too large, the viscosity of the composition rises, as a result of which the moldability decreases.

[(G) Organic Peroxide]

The organic peroxide serving as component (G) is an organic peroxide that decomposes under specific conditions, generating free radicals. One such organic peroxide may be used alone or two or more may be used in suitable combination.

Preferred use can be made of peroxyketals such as 1,1-di(tert-butylperoxy)cyclohexane and 2,2-di(4,4-di-(tert-butylperoxy)cyclohexyl)propane; hydroperoxides such as p-menthane hydroperoxide and diisopropylbenzene hydroperoxide; dialkylperoxides such as dicumyl peroxide and tert-butylcumyl peroxide; diacylperoxides such as dibenzoyl peroxide and disuccinic acid peroxide; peroxyesters such as tert-butyl peroxyacetate and tert-butyl peroxybenzoate; and peroxydicarbonates such as diisopropyl peroxydicarbonate. In particular, the use of peroxyketals, hydroperoxides, dialkylperoxides and peroxyesters having a relatively high decomposition temperature is preferred from the standpoint of handleability and shelf stability. These organic peroxides may be used in a form diluted with an optional organic solvent, hydrocarbon, liquid paraffin, inert solid or the like.

The amount of component (G) included per 100 parts by weight of component (A-3) is from 0.01 to 10 parts by weight, and preferably from 0.1 to 5 parts by weight. When the amount included is less than 0.01 part by weight, curing of the molded product does not sufficiently proceed. When this amount is more than 10 parts by weight, the molded product becomes fragile and handleability declines, in addition to which the reliability decreases on account of the large amount of decomposition residue that arises.

The thermally conductive silicone composition of the invention may additionally include components (H) and (I) shown below.

[(H) Surface Treatment]

Component (H) may be included as a surface treatment for the purpose of, when preparing the composition, uniformly dispersing the thermally conductive filler (component (B)) in a matrix of component (A-1), (A-2) or (A-3) as the base polymer.

Components (H-1) and/or (H-2) below may be used as component (H).

(H-1) Alkoxysilane compounds of general formula (3) below $$R^3_c R^4_d Si(OR^5)_{4-c-d} \qquad (3)$$

(wherein $R^3$ is independently an alkyl group of 6 to 15 carbon atoms, $R^4$ is independently a substituted or unsubstituted monovalent hydrocarbon group of 1 to 8 carbon atoms, $R^5$ is independently an alkyl group of 1 to 6 carbon atoms, the subscript c is an integer from 1 to 3, the subscript d is 0, 1 or 2, and the sum c+d is an integer from 1 to 3).

In formula (3), $R^3$ is an alkyl group having 6 to 15, preferably 8 to 12, carbon atoms, examples of which include hexyl, octyl, nonyl, decyl, dodecyl and tetradecyl groups.

$R^4$ is a substituted or unsubstituted monovalent hydrocarbon group having 1 to 8, preferably 1 to 6, carbon atoms, examples of which include alkyl groups such as methyl, ethyl, propyl, hexyl and octyl groups; cycloalkyl groups such as cyclopentyl and cyclohexyl groups; alkenyl groups such as vinyl and allyl groups; aryl groups such as phenyl and tolyl groups; aralkyl groups such as 2-phenylethyl and 2-methyl-2-phenylethyl groups; and halogenated hydrocarbon groups such as 3,3,3-trifluoropropyl, 2-(nonafluorobutyl)ethyl, 2-(heptadecafluorooctyl)ethyl and p-chlorophenyl groups. Of these, methyl and ethyl groups are preferred.

$R^5$ is an alkyl group of 1 to 6 carbon atoms, examples of which include methyl, ethyl, propyl, butyl, pentyl and hexyl groups. Of these, methyl and ethyl groups are preferred.

Preferred examples of above component (H-1) include the following.

C$_6$H$_{13}$Si(OCH$_3$)$_3$
C$_{10}$H$_{21}$Si(OCH$_3$)$_3$
C$_{12}$H$_{25}$Si(OCH$_3$)$_3$
C$_{12}$H$_{25}$Si(OC$_2$H$_5$)$_3$
C$_{10}$H$_{21}$Si(CH$_3$)(OCH$_3$)$_2$
C$_{10}$H$_{21}$Si(C$_6$H$_5$)(OCH$_3$)$_2$
C$_{10}$H$_{21}$Si(CH$_3$)(OC$_2$H$_5$)$_2$
C$_{10}$H$_{21}$Si(CH=CH$_2$)(OCH$_3$)$_2$
C$_{10}$H$_{21}$Si(CH$_2$CH$_2$CF$_3$)(OCH$_3$)$_2$

Component (H-1) may be used singly, or two or more may be used in combination.

(H-2) Dimethylpolysiloxanes of General Formula (4) Below in Which One End of the Molecular Chain is Capped with a Trialkoxysilyl Group

[Chem. 6]

(4)

(wherein R$^6$ is independently an alkyl group of 1 to 6 carbon atoms and can be exemplified in the same way as the alkyl groups represented by R$^5$ in formula (3); and the subscript e is an integer from 5 to 100, and preferably an integer from 10 to 50).

Component (H-2), by including (CH$_3$)$_2$SiO— (D units) and trimethoxy groups in a single structure, has the effect of increasing the ability of the thermally conductive filler to be loaded into component (A-1), (A-2) or (A-3) and component (C-2).

Preferred examples of component (H-2) include the following.

[Chem. 7]

It should be noted that component (H-2) has (CH$_3$)$_2$SiO— (D units), and thus differs from the (partial) hydrolytic condensate in component (C-2), which has no D units.

Component (H-2) may be used singly, or two or more may be used in combination.

Either component (H-1) or component (H-2) may be used alone, or both may be used together.

When component (H) is included during preparation of the composition, the amount added per 100 parts by weight of component (A-1), (A-2) or (A-3) is from 10 to 200 parts by weight, and preferably from 50 to 150 parts by weight. When the proportion of this component is too high, there is a possibility that it will induce oil separation. When the proportion is too low, the wettability of the organopolysiloxane and the thermally conductive filler may decrease and it may not be possible to form the composition.

[(I) Organopolysiloxane]

The organopolysiloxane of component (I) may be added for the purpose of conferring the properties of a viscosity modifier, plasticizer and the like to the thermally conductive silicone composition. By adding and including component (I), flexibility may be imparted to the composition. Component (I) is an organopolysiloxane of general formula (5) below R$^7$$_3$SiO—(R$^7$$_2$SiO)$_f$—SiR$^7$$_3$ (5)

(wherein R$^7$ is independently a monovalent hydrocarbon group of 1 to 8 carbon atoms without aliphatic unsaturated bonds, and the subscript f is an integer from 5 to 2,000) which has a kinematic viscosity at 25° C. of from 10 to 100,000 mm$^2$/s.

In formula (5), R$^7$ is independently a substituted or unsubstituted monovalent hydrocarbon group of 1 to 8 carbon atoms. Examples of R$^7$ include alkyl groups such as methyl, ethyl, propyl, isopropyl, butyl, isobutyl, tert-butyl, pentyl, neopentyl, hexyl, heptyl and octyl groups; cycloalkyl groups such as cyclopentyl, cyclohexyl and cycloheptyl groups; aryl groups such as phenyl, tolyl, xylyl and naphthyl groups; aralkyl groups such as benzyl, phenylethyl, phenylpropyl and methylbenzyl groups; and any of these groups in which some or all hydrogen atoms bonded to carbon atoms are substituted with halogen atoms such as fluorine, chlorine or bromine, cyano groups or the like, specific examples of which include chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups. Typical examples are those having from 1 to 10 carbon atoms, and especially ones having from 1 to 6 carbon atoms, with the following being preferred: substituted or unsubstituted alkyl groups of 1 to 3 carbon atoms, such as methyl, ethyl, propyl, chloromethyl, bromoethyl, 3,3,3-trifluoropropyl and cyanoethyl groups; and substituted or unsubstituted phenyl groups such as phenyl, chlorophenyl and fluorophenyl groups. Methyl and phenyl groups are especially preferred.

The subscript f, from the standpoint of the required kinematic viscosity, is preferably an integer from 5 to 2,000, and more preferably an integer from 10 to 1,000.

The kinematic viscosity at 25° C. is preferably from 10 to 100,000 mm$^2$/s, and more preferably from 100 to 10,000 mm$^2$/s. When the kinematic viscosity is lower than 10 mm$^2$/s, oil bleeding tends to arise in cured products of the composition. When the kinematic viscosity is higher than 100,000 mm$^2$/s, the resulting thermally conductive composition tends to have a poor flexibility.

Component (I) may be of one type used alone, or two or more may be used together.

When component (I) is added to the inventive composition, although the amount of addition is not limited so long as it is an amount at which the desired effects are obtained, the amount added per 100 parts by weight of the base polymer, that is, component (A-1), (A-2) or (A-3), is preferably from 1 to 40 parts by weight, and more preferably from 10 to 20 parts by weight. When the amount added is in this range, the thermally conductive composition prior to curing has a good flowability, the workability is readily maintained, and loading of the thermally conductive filler into the composition is easy.

The thermally conductive silicone composition of the invention may additionally include other ingredients, such as internal mold release agents, colorants and antioxidants, within ranges that do not adversely affect the objects of the invention.

The thermally conductive silicone composition of the invention can be prepared by uniformly mixing together given amounts of the respective above ingredients.

With regard to the above curable silicone compositions, the curing conditions for addition-curable thermally conductive silicone compositions may be set to from 100 to 140° C., especially 110 to 130° C., for 5 to 30 minutes, especially 10 to 20 minutes. The curing conditions for condensation-curable thermally conductive silicone compositions may be set to 40° C. or less, especially 0 to 40° C., for 0.5 to 30 days, especially 1 to 15 days. The curing conditions for organic peroxide-curable thermally conductive silicone composition may be set to from 110 to 190° C., especially 120 to 170° C., for 5 to 30 minutes, especially 10 to 20 minutes.

Owing to the use of the specific thermally conductive filler of the invention, the thermal conductivity of cured products of thermally conductive silicone compositions according to the invention that are thus obtained can be set to at least 5 W/mK, and especially from 5 to 15 W/mK.

The thermally conductive silicone compositions of the invention have an excellent moldability, a high thermal conductivity and a low thermal resistance, enabling cured products to be obtained that have an excellent water resistance and a good adherence during packaging, and that, moreover, can be furnished at low cost.

EXAMPLES

The invention is illustrated more fully below by way of Examples and Comparative Examples, although the invention is not limited by these Examples.

Components (A) to (I) used in the compositions in the following Examples and Comparative Examples are shown below.

Component (A): Base polymer
Component (A-1): An organopolysiloxane having a kinematic viscosity at 25° C. of 600 mm²/s.

[Chem. 8]

$$Vi-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_h-\underset{\underset{OCH_3}{|}}{\overset{\overset{OCH_3}{|}}{Si}}-Vi$$

(wherein Vi is a vinyl group, and h is a number such that the kinematic viscosity becomes 600 mm²/s)

Component (A-2): A dimethylpolysiloxane capped at both ends with hydroxyl groups and having a kinematic viscosity at 25° C. of 700 mm²/s.

Component (B): Thermally Conductive Filler
Component (B-1): Crushed alumina having an average particle size of 1 μm (AL-47-1, from Showa Denko KK)
Component (B-2): Crushed alumina having an average particle size of 20 μm (AA-18, from Sumitomo Chemical Co., Ltd.)
Component (B-3): Crushed aluminum nitride having an average particle size of 1 μm (H-01, from Tokuyama Corporation)
Component (B-4): Spherical aluminum nitride having an average particle size of 30 μm (FAN-f-30, from Furukawa Denshi Co., Ltd.)
Component (B-5): Crushed aluminum nitride having an average particle size of 40 μm (TFG-N40P, from Toyo Aluminum KK)
Component (B-6): Spherical aluminum nitride having an average particle size of 50 μm (FAN-f-50, from Furukawa Denshi Co., Ltd.)
Component (B-7): Spherical aluminum nitride having an average particle size of 80 μm (FAN-f-80, from Furukawa Denshi Co., Ltd.)
Component (C): Crosslinking Agent
Component (C-1): Methylhydrogenpolysiloxane of the following formula having the average degree of polymerization indicated below

[Chem. 9]

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_o-\left(\underset{\underset{CH_3}{|}}{\overset{\overset{H}{|}}{Si}}-O\right)_p-\underset{\underset{CH_3}{|}}{\overset{\overset{CH_3}{|}}{Si}}-CH_3$$

(average degree of polymerization: o=28, p=2)
Component (C-2): Phenyltri(isopropenoxy)silane of the following formula

[Chem.10]

Component (D): Platinum family metal-based curing catalyst
5 wt % Solution of chloroplatinic acid in 2-ethylhexanol
Component (E): Addition reaction regulator
Ethynyl methylidene carbinol
Component (F): Curing catalyst for condensation reaction
Tetramethylguanidylpropyltrimethoxysilane of the following formula

[Chem. 11]

Component (G): Organic peroxide
1,1-Di(tert-butylperoxy)cyclohexane of the following formula Component (H): Surface treatment
Component (H-2): Dimethylpolysiloxane of the following formula that is capped at one end with a trimethoxysilyl group and has an average degree of polymerization of 30

Component (I): Plasticizer
Dimethylpolysiloxane of the following formula that has a kinematic viscosity at 25° C. of 800 mm²/s.

Examples 1 to 7, Comparative Examples 1 to 7

Compositions were prepared from the above ingredients by the method described below, and thermally conductive moldings were obtained using these compositions. The compositions and moldings were evaluated by the methods described below. The results obtained are shown in Tables 1 and 2.

[Preparation of Addition-Curable Thermally Conductive Silicon Compositions]

Components (A-1), (B) and (H) were added in the amounts shown below for Examples 1 to 3 and Comparative Examples 1 to 3, and kneaded for 60 minutes in a planetary mixer.

Next, Components (D), (E) and (I) were added in the amounts shown below for Examples 1 to 3 and Comparative Examples 1 to 3, in addition to which 10 parts by weight of an internal mold release agent (KF-54, from Shin-Etsu Chemical Co., Ltd.) which promotes release from a separator was added and 30 more minutes of kneading was carried out.

To this was further added component (C-1) in the amounts shown below for Examples 1 to 3 and Comparative Examples 1 to 3, and 30 minutes of kneading was carried out, giving the composition.

[Molding of Addition-Curable Thermally Conductive Silicone Compositions]

The resulting compositions were cast into 60 mm×60 mm×6 mm molds and 60 mm×60 mm×1 mm molds and molded at 120° C. for 10 minutes using a press molding machine, thereby giving thermally conductive moldings.

[Preparation of Condensation-Curable Thermally Conductive Silicone Compositions]

Components (A-2), (B) and (H) were added in the amounts shown below for Examples 4 to 6 and Comparative Examples 4 to 6, and kneaded for 60 minutes in a planetary mixer.

Next, Components (C-2), (F) and (I) were added in the amounts shown below for Examples 4 to 6 and Comparative Examples 4 to 6, in addition to which 10 parts by weight of an internal mold release agent (KF-54, from Shin-Etsu Chemical Co., Ltd.) which promotes release from a separator was added and 30 more minutes of kneading was carried out.

[Molding of Condensation-Curable Thermally Conductive Silicone Compositions]

The resulting compositions were cast into 60 mm×60 mm×6 mm molds and 60 mm×60 mm×1 mm molds and left to stand at 23±2° C. and 50±5% RH for 7 days, thereby giving thermally conductive moldings.

[Preparation of Organic Peroxide-Curable Thermally Conductive Silicone Compositions]

Components (A-1), (B) and (H) were added in the amounts shown below for Example 7 and Comparative Example 7, and kneaded for 60 minutes in a planetary mixer.

Next, Component (I) was added in the amount shown below for Example 7 and Comparative Example 7, in addition to which 10 parts by weight of an internal mold release agent (KF-54, from Shin-Etsu Chemical Co., Ltd.) which promotes release from a separator was added and 30 more minutes of kneading was carried out.

To this was additionally added component (G) in the amounts shown below for Example 7 and Comparative Example 7, and 30 minutes of kneading was carried out, giving the composition.

[Molding of Organic Peroxide-Curable Thermally Conductive Silicone Compositions]

The resulting compositions were cast into 60 mm×60 mm×6 mm molds and 60 mm×60 mm×1 mm molds and molded at 120° C. for 10 minutes, thereby giving thermally conductive moldings.

[Evaluation Methods]
Moldability:

Regarding the compositions obtained in Examples 1 to 7 and Comparative Examples 1 to 7, when cast into a mold, compositions that retained flowability and could be molded were rated as "O"; compositions that had a very poor flowability and could not be molded were rated as "X."

Thermal Conductivity:

The compositions obtained in Examples 1 to 7 and Comparative Examples 1 to 7 were cured into 6 mm thick sheets and, using two such sheets, the thermal conductivity of the sheets was measured with a thermal conductivity meter (available under the trade name TPA-501 from Kyoto Electronics Manufacturing Co., Ltd.).

HAST Resistance:

The compositions obtained in Examples 1 to 7 and Comparative Examples 1 to 7 were cured as 1 mm thick sheets, and the thermal resistances were measured (measurement conditions: 100° C., 50 psi, 30 min) based on ASTM D5470. In addition, the cured sheets were aged 500 hours at 85° C. and 85% RH, and the thermal resistance was measured under these conditions. Those specimens for which curing of the sheet proceeded with aging under the above HAST conditions and the thermal resistance rose significantly after aging compared with before aging were judged to have a poor HAST resistance.

TABLE 1

| | Ingredients (pbw) | Example 1 | 2 | 3 | 4 | 5 | 6 | 7 |
|---|---|---|---|---|---|---|---|---|
| (A) | (A-1) | 100 | 100 | 100 | — | — | — | 100 |
| | (A-2) | — | — | — | 100 | 100 | 100 | — |
| (B) | (B-1) | 900 | 900 | 550 | 600 | 600 | 600 | 600 |
| | (B-2) | — | — | — | — | — | — | — |
| | (B-3) | — | — | — | — | — | — | — |
| | (B-4) | 400 | 400 | 600 | 450 | 450 | 350 | — |
| | (B-5) | 600 | — | — | 450 | — | 500 | 600 |
| | (B-6) | — | 500 | 400 | — | 450 | 350 | 750 |
| | (B-7) | 550 | 750 | 600 | 700 | 700 | 550 | — |
| (C) | (C-1) | 6.5 | 6.5 | 6.5 | — | — | — | — |
| | (C-2) | — | — | — | 20 | 20 | 20 | — |
| | (D) | 3 | 3 | 3 | — | — | — | — |
| | (E) | 0.5 | 0.5 | 0.5 | — | — | — | — |
| | (F) | — | — | — | 5 | 5 | 5 | — |
| | (G) | — | — | — | — | — | — | 2 |
| (H) | (H-2) | 50 | 50 | 50 | 50 | 50 | 50 | 50 |
| | (I) | 15 | 15 | 15 | 15 | 15 | 15 | 15 |
| | ((B-1) + (B-2))/Total weight of B (wt %) | 37 | 35 | 26 | 27 | 27 | 26 | 31 |
| | (B-5)/Total weight of (B) (wt %) | 24 | — | — | 20 | — | 21 | 31 |
| | Total weight of (B)/Total weight of composition (wt %) | 93 | 94 | 92 | 92 | 92 | 93 | 92 |
| | (C-1) SiH/(A-1) SiH (molar ratio) | 1.1 | 1.1 | 1.1 | — | — | — | — |
| | Evaluation Results | | | | | | | |
| | Moldability | ○ | ○ | ○ | ○ | ○ | ○ | ○ |
| | Thermal conductivity (W/mK) | 8.0 | 7.9 | 8.4 | 9.0 | 8.5 | 8.0 | 6.8 |
| | Thermal resistance (° C.-cm$^2$/W) | 1.89 | 1.98 | 1.75 | 1.63 | 1.72 | 1.95 | 2.21 |
| | Thermal resistance after HAST aging (° C.-cm$^2$/W) | 1.91 | 2.00 | 1.80 | 1.69 | 1.78 | 1.99 | 2.28 |

TABLE 2

| | Ingredients (pbw) | Comparative Example 1 | 2 | 3 | 4 | 5 | 6 | 7 |
|---|---|---|---|---|---|---|---|---|
| (A) | (A-1) | 100 | 100 | 100 | — | — | — | 100 |
| | (A-2) | — | — | — | 100 | 100 | 100 | — |
| (B) | (B-1) | 200 | 1,750 | 250 | — | — | 250 | 1,500 |
| | (B-2) | — | — | — | 750 | — | — | — |
| | (B-3) | — | — | — | — | 750 | — | — |
| | (B-4) | 350 | — | 400 | 450 | — | 400 | — |
| | (B-5) | — | 200 | 1,200 | — | 450 | — | 300 |
| | (B-6) | 1,500 | 200 | — | 450 | 450 | 650 | 300 |
| | (B-7) | 500 | 400 | 500 | 500 | 500 | 600 | 200 |
| (C) | (C-1) | 6.5 | 6.5 | 6.5 | — | — | — | — |
| | (C-2) | — | — | — | 20 | 20 | 20 | — |
| | (D) | 3 | 3 | 3 | — | — | — | — |
| | (E) | 0.5 | 0.5 | 0.5 | — | — | — | — |
| | (F) | — | — | — | 5 | 5 | 5 | — |
| | (G) | — | — | — | — | — | — | 2 |
| (H) | (H-2) | 50 | 50 | 50 | 50 | 50 | 50 | 50 |
| | (I) | 15 | 15 | 15 | 15 | 15 | 15 | 15 |
| | ((B-1) + (B-2))/Total weight of B (wt %) | 8 | 69 | 11 | 35 | — | 13 | 65 |
| | (B-5)/Total weight of (B) (wt %) | — | 8 | 51 | — | 21 | — | 13 |
| | Total weight of (B)/Total weight of composition (wt %) | 94 | 94 | 93 | 92 | 92 | 91 | 93 |
| | (C-1) SiH/(A-1) SiH (molar ratio) | 1.1 | 1.1 | 1.1 | — | — | — | — |
| | Evaluation Results | | | | | | | |
| | Moldability | ○ | ○ | X | X | X | ○ | ○ |
| | Thermal conductivity (W/mK) | 8.9 | 4.7 | ND | ND | ND | 7.8 | 3.9 |
| | Thermal resistance (° C.-cm$^2$/W) | 1.65 | 3.10 | ND | ND | ND | 1.61 | 3.45 |
| | Thermal resistance after HAST aging (° C.-cm$^2$/W) | 2.05 | 3.12 | ND | ND | ND | 2.19 | 3.50 |

As is apparent from Table 1, in Examples 1 to 7, crushed alumina having an average particle size of 0.1 to 5 μm and crushed and/or spherical aluminum nitride having an average particle size of 10 to 100 μm are included as constituents of the thermally conductive filler, with the proportion of crushed alumina in the thermally conductive filler being set to at least 15 wt % and not more than 55 wt %. In addition, when crushed aluminum nitride having an average particle size of from 10 to 100 μm is used as a constituent of the aluminum nitride, because it is included in a ratio, based on the total weight of the thermally conductive filler, of at least 10 wt % and not more than 50 wt %, the moldability of the composition is excellent and cured products can be obtained which exhibit a higher thermal conductivity and a lower thermal resistance. Also, by including crushed alumina having an average particle size of 10 to 100 μm in a proportion of at least 15 wt % and up to 55 wt % based on the total weight of the thermally conductive filler, curing of the moldings did not proceed to a marked degree after HAST aging and a rise in thermal resistance was not observed.

Also, as is apparent from Table 2, in Comparative Examples 1 and 6, because crushed alumina having an average particle size of 1 μm accounts for less than 15 wt % of the total weight of the thermally conductive filler, the thermal resistance ended up increasing when the moldings were HAST aged. In Comparative Examples 2 and 7, because crushed alumina having an average particle size of 1 μm accounted for more than 55 wt % of the total weight of the thermally conductive filler, the thermal conductivity of the cured product ended up decreasing and the thermal resistance rose. In Comparative Example 3, because crushed alumina having an average particle size of 1 μm accounted for less than 15 wt % of the total weight of the thermally conductive filler and crushed aluminum nitride having an average particle size of 10 to 100 μm accounted for more than 50 wt % of the total weight of the thermally conductive filler, the viscosity of the composition rose, making the composition difficult to mold. In Comparative Example 4, because crushed alumina having an average particle size of 0.1 to 5 μm was not used and crushed alumina having an average particle size of 20 μm was used, the surface area of the thermally conductive filler increased and the effects of the surface treatment decreased. As a result, the viscosity of the composition rose and molding was difficult. In Comparative Example 5, because crushed alumina having an average particle size of 0.1 to 5 μm was not used and crushed aluminum nitride having an average particle size of 1 μm was used, as in Comparative Example 4, the effects of the surface treatment decreased more than when crushed alumina was used, and molding was similarly difficult.

The invention claimed is:

1. A thermally conductive silicone composition comprising an organopolysiloxane as a base polymer and a thermally conductive filler, wherein the thermally conductive filler includes aluminum nitride having an average particle size of 10 to 100 μm and crushed alumina having an average particle size of 0.1 to 5 μm, the crushed alumina accounting for 15 to 55 wt % of the collective amount of aluminum nitride and crushed alumina, and the aluminum nitride and crushed alumina collectively accounting for 60 to 95 wt % of the thermally conductive silicone composition.

2. The thermally conductive silicone composition of claim 1, comprising:
(A-1) 100 parts by weight of an organopolysiloxane containing at least two silicon-bonded alkenyl groups on the molecule and having a kinematic viscosity at 25° C. of from 10 to 100,000 mm²/s;
(B) from 1,000 to 4,000 parts by weight of, as the thermally conductive filler, aluminum nitride having an average particle size of 10 to 100 μm and crushed alumina having an average particle size of 0.1 to 5 μm;
(C-1) an organohydrogenpolysiloxane having at least two hydrogen atoms directly bonded to silicon atoms, in an amount such that the number of moles of hydrogen atoms directly bonded to silicon atoms is from 0.1 to 8 moles per mole of alkenyl groups from component (A-1); and
(D) from 0.1 to 2,000 ppm of a platinum family metal-based curing catalyst, expressed as the weight of the platinum family metallic element with respect to component (A-1), wherein the crushed alumina in component (B) is included in a proportion of at least 15 wt % and not more than 55 wt % of the total weight of component (B).

3. The thermally conductive silicone composition of claim 1, comprising:
(A-2) 100 parts by weight of an organopolysiloxane of general formula (1) below

[Chem. 1]

(wherein the R¹ groups are mutually like or unlike unsubstituted, halogen-substituted or cyano-substituted alkyl groups of 1 to 5 carbon atoms or aryl groups of 6 to 8 carbon atoms; and the subscript "a" is a number that sets the kinematic viscosity at 25° C. of the organopolysiloxane of formula (1) to the below-indicated value) which is capped at both ends with hydroxyl groups and has a kinematic viscosity at 25° C. of from 10 to 100,000 mm²/s;
(B) from 1,000 to 4,000 parts by weight of, as the thermally conductive filler, aluminum nitride having an average particle size of 10 to 100 μm and crushed alumina having an average particle size of 0.1 to 5 μm;
(C-2) from 1 to 40 parts by weight of one or more selected from the group consisting of silane compounds of general formula (2) below $$R^2{}_b\text{—SiX}_{(4-b)} \quad (2)$$

(wherein R² is an unsubstituted, halogen-substituted or cyano-substituted alkyl group of 1 to 3 carbon atoms, vinyl group or phenyl group; X is a hydrolyzable group; and the subscript b is 0 or 1), (partial) hydrolyzates thereof and (partial) hydrolytic condensates thereof; and
(F) from 0.01 to 20 parts by weight of a curing catalyst for a condensation reaction selected from the group consisting of alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, lower fatty acid salts of alkali metals, dialkylhydroxylamines and guanidyl group-containing silanes and siloxanes, wherein the crushed alumina in component (B) is included in a proportion of at least 15 wt % and not more than 55 wt % of the total weight of component (B).

4. The thermally conductive silicone composition of claim 1, comprising:
(A-3) 100 parts by weight of an organopolysiloxane containing at least two silicon-bonded alkenyl groups on the molecule and having a kinematic viscosity at 25° C. of from 10 to 100,000 mm²/s;
(B) from 1,000 to 4,000 parts by weight of, as the thermally conductive filler, aluminum nitride having an average particle size of 10 to 100 μm and crushed alumina having an average particle size of 0.1 to 5 μm; and (G) from 0.01 to 10 parts by weight of an organic peroxide, wherein the crushed alumina in component (B) is included in a proportion of at least 15 wt % and not more than 55 wt % of the total weight of component (B).

5. The thermally conductive silicone composition of claim 1, wherein the aluminum nitride in the thermally conductive filler is crushed and/or spherical.

6. The thermally conductive silicone composition of claim 5, wherein crushed aluminum nitride having an average particle size of 10 to 100 µm in the thermally conductive filler is included in a proportion of at least 10 wt % and not more than 50 wt % of the total weight of the thermally conductive filler.

7. The thermally conductive silicone composition of claim 2 which further comprises, as component (H), from 10 to 200 parts by weight per 100 parts by weight of component (A-1), (A-2) or (A-3) of at least one selected from the group consisting of:

(H-1) alkoxy silane compounds of general formula (3) below (wherein $R^3$ is independently an alkyl group of 6 to 15 carbon atoms, $R^4$ is independently a substituted or unsubstituted monovalent hydrocarbon group of 1 to 8 carbon atoms, $R^5$ is independently an alkyl group of 1 to 6 carbon atoms, the subscript c is an integer from 1 to 3, the subscript d is 0, 1 or 2, and the sum c+d is an integer from 1 to 3); and (H-2) dimethylpolysiloxanes of general formula (4) below

[Chem. 2]

(4)

(wherein $R^6$ is independently an alkyl group of 1 to 6 carbon atoms, and the subscript e is an integer from 5 to 100) which are capped at one end of the molecular chain with a trialkoxysilyl group.

8. The thermally conductive silicone composition of claim 2 which further comprises:

(I) from 1 to 40 parts by weight, per 100 parts by weight of component (A-1), (A-2) or (A-3), of an organopolysiloxane of general formula (5) below (wherein $R^7$ is independently a monovalent hydrocarbon group of 1 to 8 carbon atoms without aliphatic unsaturated bonds, and the subscript f is an integer from 5 to 2,000) having a kinematic viscosity at 25° C. of from 10 to 100,000 mm$^2$/s.

9. A cured product of the thermally conductive silicone composition of claim 1, which cured product has a thermal conductivity of at least 5 W/mK.

* * * * *